(12) United States Patent
Thompkins

(10) Patent No.: US 9,099,898 B2
(45) Date of Patent: Aug. 4, 2015

(54) CLUTCH CONTROLLED FRICTION DRIVE WHEELMILL FOR GENERATING ELECTRICITY

(71) Applicant: Torek Thompkins, Orlando, FL (US)

(72) Inventor: Torek Thompkins, Orlando, FL (US)

( * ) Notice: Subject to any disclaimer, the term of this patent is extended or adjusted under 35 U.S.C. 154(b) by 0 days.

(21) Appl. No.: 14/078,307

(22) Filed: Nov. 12, 2013

(65) Prior Publication Data

US 2014/0070540 A1 Mar. 13, 2014

Related U.S. Application Data

(63) Continuation-in-part of application No. 13/374,229, filed on Dec. 16, 2011, now abandoned.

(51) Int. Cl.
*F02B 63/04* (2006.01)
*H02K 7/18* (2006.01)
*H02J 7/14* (2006.01)
*H02K 7/116* (2006.01)

(52) U.S. Cl.
CPC ............ *H02K 7/1846* (2013.01); *H02J 7/1415* (2013.01); *H02K 7/116* (2013.01)

(58) Field of Classification Search
USPC ................................ 290/1 R; 310/68 B, 75 C
IPC .............. H02K 7/1846; B62J 6/12; B62M 1/10
See application file for complete search history.

(56) References Cited

U.S. PATENT DOCUMENTS

| 4,429,232 A * | 1/1984 | Thomas et al. ................ 290/1 R |
| 4,536,668 A * | 8/1985 | Boyer .......................... 310/75 R |
| 4,539,496 A * | 9/1985 | Thomas et al. .............. 310/68 B |
| 4,951,769 A * | 8/1990 | Kawamura ............... 180/65.245 |
| 6,992,413 B2 * | 1/2006 | Endo et al. ................... 310/67 A |
| 7,479,079 B2 * | 1/2009 | Takeda et al. ..................... 475/3 |
| 7,679,210 B2 * | 3/2010 | Zhu ................................. 290/55 |
| 7,747,355 B2 * | 6/2010 | Bulthaup et al. .............. 700/287 |
| 2007/0090702 A1* | 4/2007 | Schiller ....................... 310/75 C |
| 2009/0194998 A1* | 8/2009 | Lin ................................. 290/1 R |
| 2012/0146339 A1* | 6/2012 | Lee .................................... 290/1 |

* cited by examiner

*Primary Examiner* — Vanessa Girardi
(74) *Attorney, Agent, or Firm* — Shanti M. Hill, Esq.; Beusse Wolter Sanks & Maire, P.A.

(57) ABSTRACT

A device is disclosed comprising a wheelmill having a cylindrical shape adapted to receive a rotatable shaft of a generator and a one way clutch housed within the inner portion of the wheelmill in communication with the shaft such that said shaft may rotate in one direction only and a generator in communication with the shaft.

7 Claims, 7 Drawing Sheets

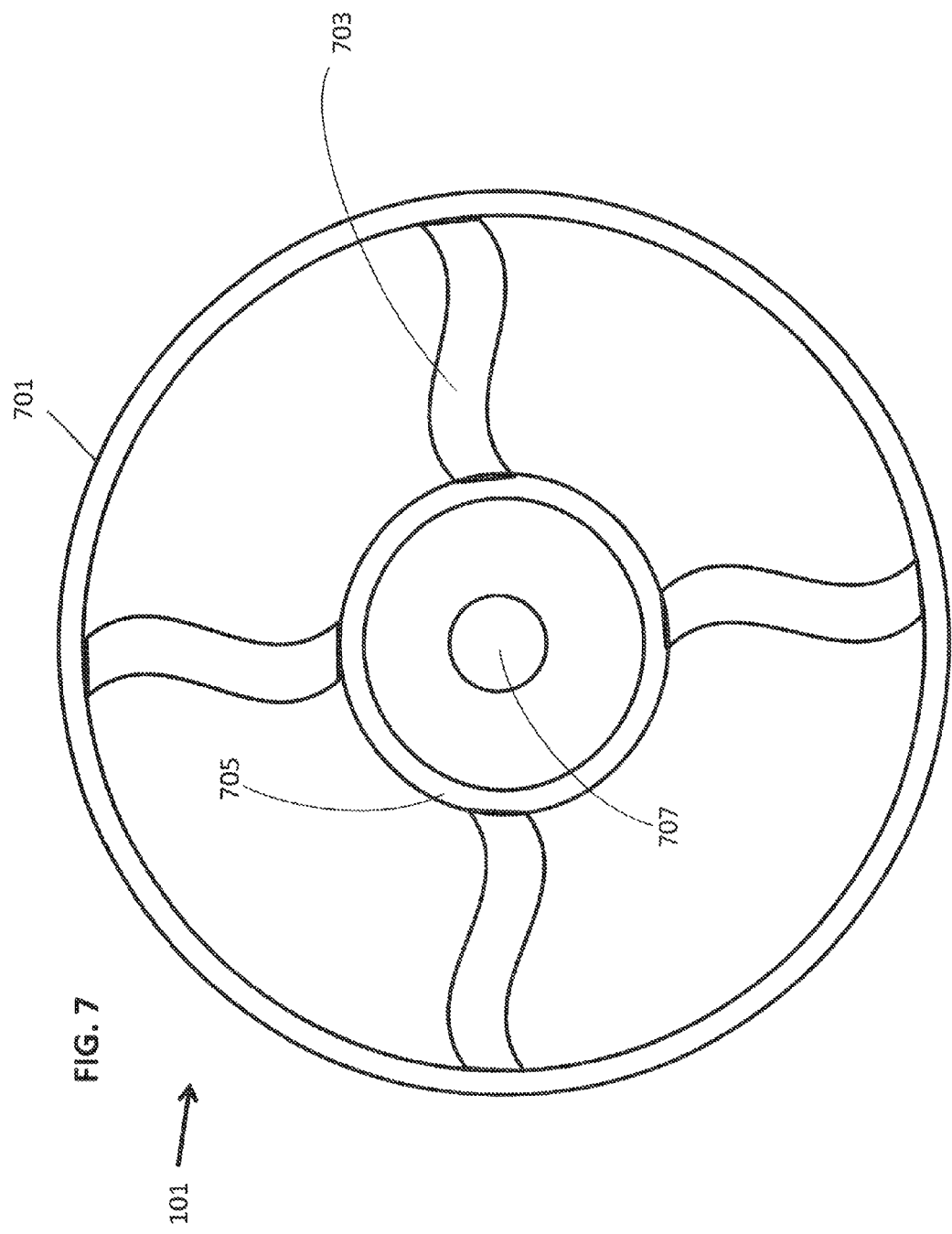

CLUTCH CONTROLLED FRICTION DRIVE WHEELMILL FOR GENERATING ELECTRICITY

CROSS REFERENCE TO RELATED INVENTIONS

This application is a continuation-in-part of and claims priority to U.S. Nonprovisional application 13/374,229 filed Dec. 16, 2011 by Torek Thompkins. The specification of this application is incorporated by reference in its entirety for all purposes.

FIELD OF THE INVENTION

The embodiments of the present invention relate generally to the field of energy generation.

COPYRIGHT

Copyright—A portion of the disclosure of this document contains material that is subject to copyright protection. The copyright owner has no objection to the facsimile reproduction by anyone of the patent document or the patent disclosure, as it appears in publically available Patent and Trademark Office patent files or records, but otherwise reserves all copyright rights whatsoever. The following notice applies to the content described below and in the drawings that form a part of this document: Copyright Torek Al-Amin Thompkins, All Rights Reserved.

BACKGROUND

Generators for producing energy work by collecting and converting kinetic energy created through mechanical means such as a spinning action. Windmills are an example. There have also been attempts to generate energy based on the movement of vehicles.

One type of device for electricity generation in motor vehicles makes use of a ground engagement wheel. For instance, U.S. Pat. No. 5,921,334 Al Dokhi claims a ground dragging wheel on the undercarriage of a vehicle connected to a pulley operating to spin the shaft of a generator. This configuration requires movement of the vehicle in order to produce energy. U.S. Pat. No. 5,680,907 to Weihe discloses a similar ground engagement wheel as Al-Dokhi except that the ground engagement wheel is used simply as a gear to move the vehicle wheel, not for producing energy (the wheel is itself powered by solar panels on the roof of the vehicle claimed).

Another example of electrical generation from vehicles is regenerative braking. These systems only create energy while braking or going downhill.

BRIEF DESCRIPTION OF THE DRAWINGS

FIG. 7 shows an alternate embodiment of the wheelmill showing flexible shock absorbing spokes within the wheelmill body.

DETAILED DESCRIPTION

Disclosed is an improved device the generating energy. When coupled with the wheel of a vehicle, the device produces energy even when the vehicle has stopped or is moving in reverse. The device generates energy when vehicle stops/reverses if its previous momentum has not yet dissipated. The device preferably comprises a generator and wheelmill having a threaded inlet for receiving a shaft of the generator, such that the rotation of the wheelmill results in the generation of energy by the device. The wheelmill functions as a friction roller along the inside wall of a vehicle wheel (hereinafter referred to as the "host wheel"). The device is adapted for mounting on a vehicle such that the wheelmill communicates with and is spun by the inside wall of a host wheel. The generator and shaft connecting the generator to the wheelmill are preferably mounted to the vehicle's undercarriage or shock absorption assembly. The wheelmill includes a one-way clutch which allows wheelmill to spin bidirectionally while preventing backspin of the connected shaft in the event the host wheel stops, slows, or reverses. The device improves on previous techniques for generation of energy from the movement of a vehicle wheel. The improvements include the adaptation for attachment to the inner surface inside wall of the host wheel. Using the host wheel's inner wall surface (the "inside wall"), the wheelmill has a different axis and a smaller diameter than the host wheel. Its RPMs are multiple times greater than the host wheel, which allows the wheelmill generator system to have a higher RPM input than the host wheel offers around its own axis. This disclosure will first address the construction of the device. Next, it will explain how the device operates to produce energy.

Figure 1:
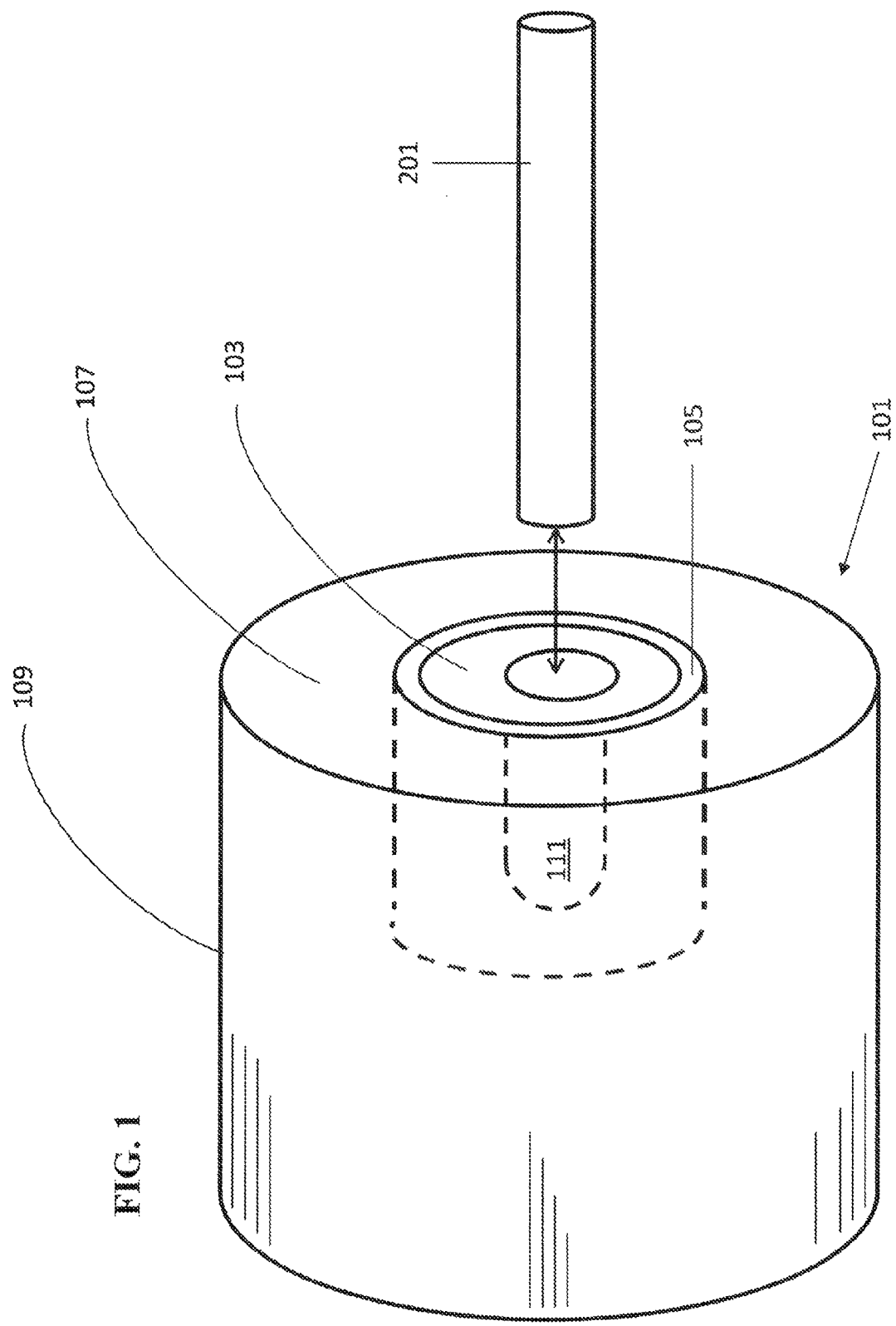
FIG. 1 is a view of the wheelmill showing connectivity to a shaft in accordance with an embodiment of the device.
Figure 3:
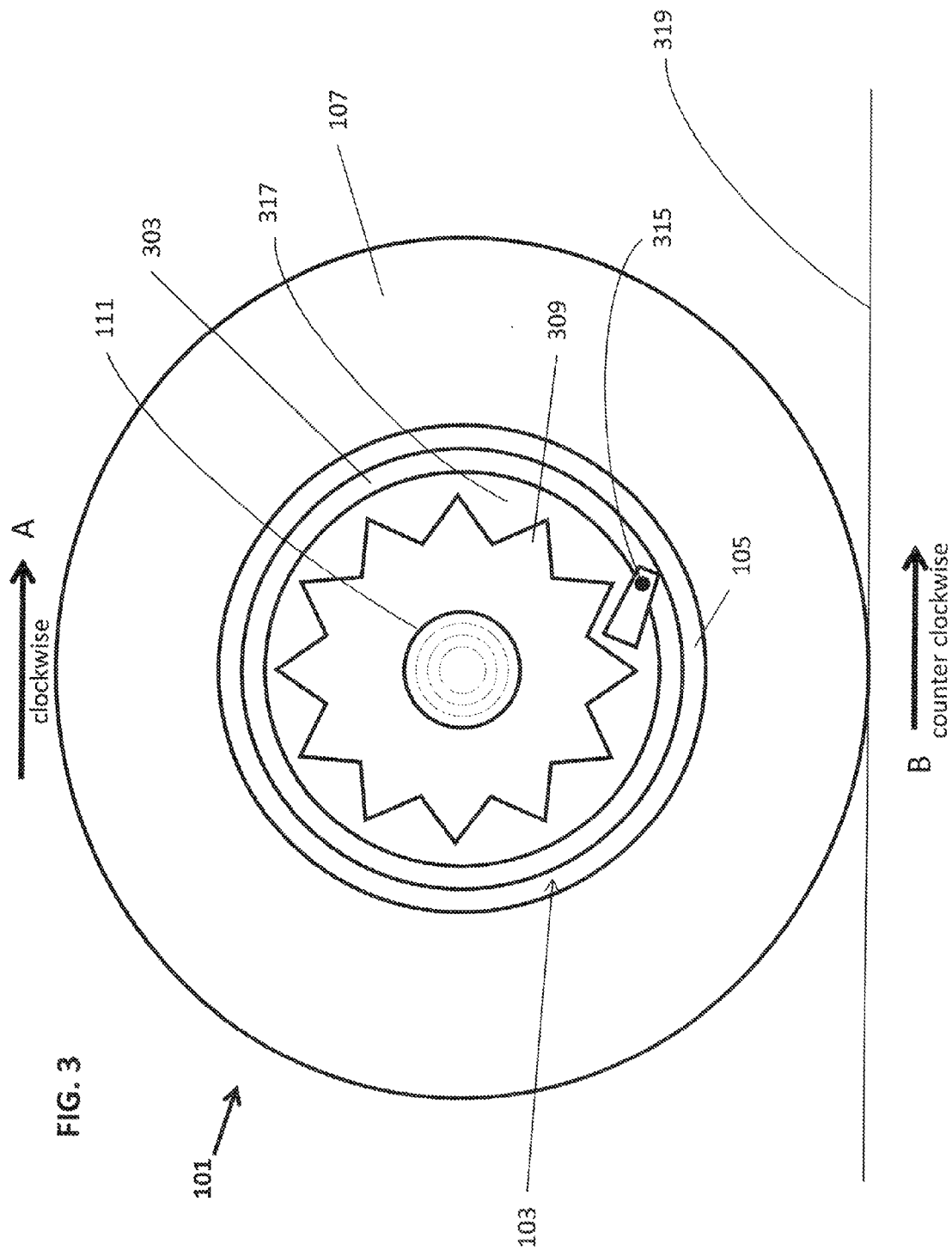
FIG. 3 shows a detailed view of the wheelmill of the device showing a one way clutch in accordance with an embodiment.

The device disclosed may be a wheelmill coupled with a shaft and generator or the wheelmill alone. FIGS. 1 and 3 show the preferred embodiment of wheelmill 101 of the device. Wheelmill 101 is shaped like a wheel and is preferably comprised of a body 107. Which may be solid rubberized material with tread on its outer surface 109. Disposed within the body is a one way clutch 103 (also referred to as the "clutch") surrounded by the wheelmill's inner rim 105. Inner rim 105 may be a rigid metal, hollow or solid. The material used may be aluminum because it is lightweight and easily dissipates heat, however a heavier material may be used. The inner rim 105 serves to put the one way clutch 103 in communication with the body 107, however, body may be in direct communication with clutch 103.

Clutch 103 may be any one way clutch known in the art for allowing the disengagement of the shaft spin when the vehicle wheel slows or stops. Disposed within clutch 103, is preferably a threaded inlet 111 so that a shaft 201 may be screwed into the threaded inlet 111. Alternate connection means for communicating the shaft to the wheelmill known in the art are anticipated and may be used. FIG. 1 depicts clutch 103 is disposed within body 107 such that its depth within body 107 is half the depth of body 107. However, clutch 103 may span the body 107 in other embodiments.

Figure 2:
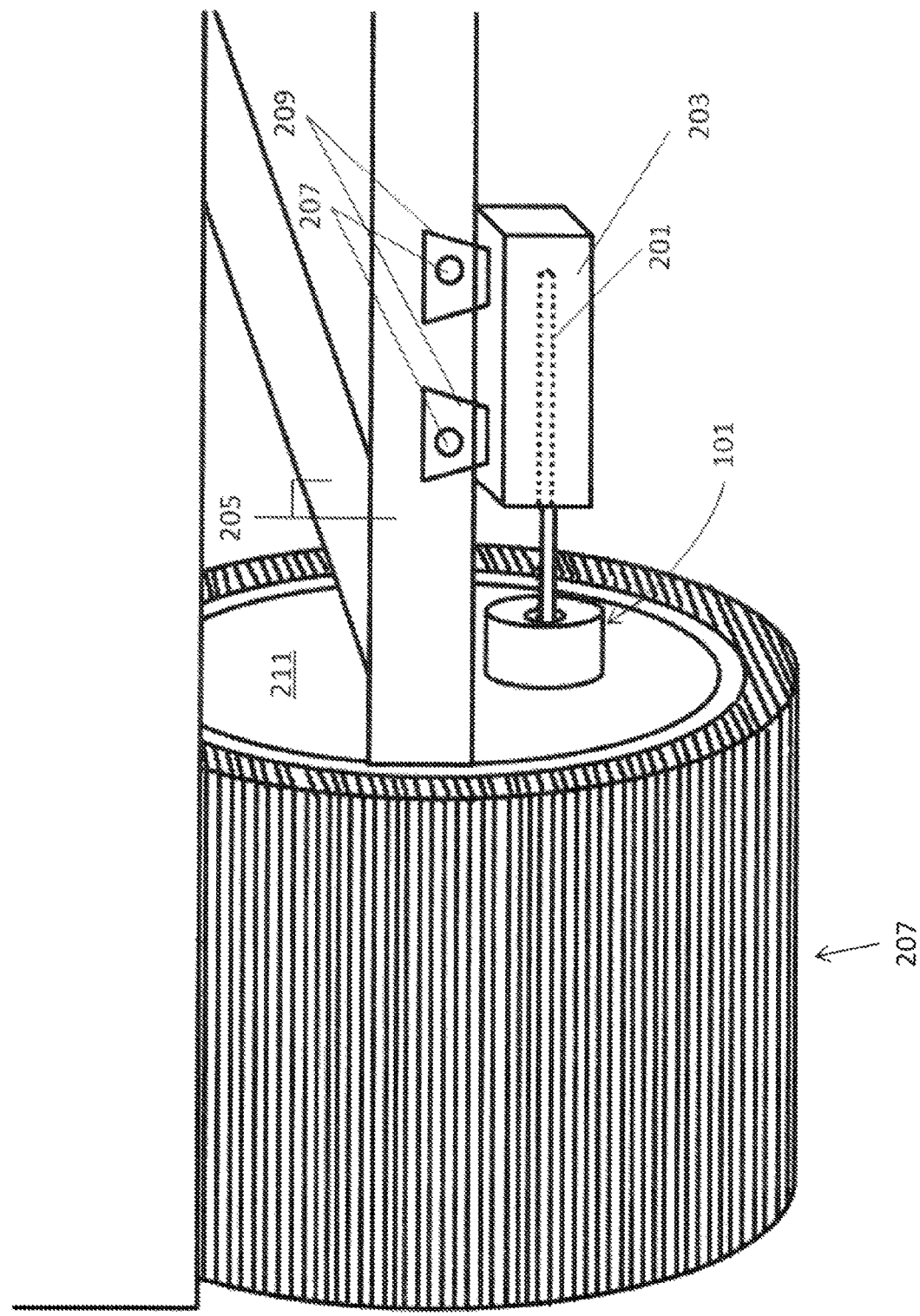
FIG. 2 shows the device mounted to a vehicle in accordance with an embodiment.

FIG. 2 shows the device attached to a vehicle such that the wheelmill 101 is in communication with the inside wall 211 of the host wheel 207. This Figure also shows an alternate view of the rotatable shaft 201 in communication with generator 203, mounted to the vehicle undercarriage 205 via mounting plates 209. Other connection means may be used, and the generator may also be in communication with a battery for storage, or supply energy directly to the vehicle. This Figure also shows the unique location of wheelmill 101, as it makes use of the inside wall 211 of the host wheel 207 to rotate the wheelmill 101. This subsequently rotates the shaft 201, so as to produce electricity within generator 203.

FIG. 2 also shows the device adapted such that wheelmill 101 is placed on the inside wall of the host wheel 207. Generator 203 is connected to the vehicle, preferably on vehicle frame 205. Connections 209 may be any connections known in the art for attaching generator 203 to the vehicle frame 205. Connections may be metal fasteners with screws 207 for attaching generator 203 to the vehicle frame 205, however the device may also be mounted on the vehicle's shock absorption assembly such as the vehicle's wheel arm. This will allow for movement of the device in harmony with the vehicle as the vehicle encounters irregular road surface conditions, such as bumps or potholes.

Although the vehicle shown in FIG. 3 is an automobile, the term "vehicle" for the purpose of this disclosure shall mean any device having at least one wheel which may move in at least a forward direction through mechanical or electrical means. In the preferred embodiment, "vehicle" refers to an automobile (powered by either electricity, an internal combustion engine or a combination of both), however vehicle may refer to a scooter, motorcycle, Segway, or even bicycle or unicycle.

Figure 4:
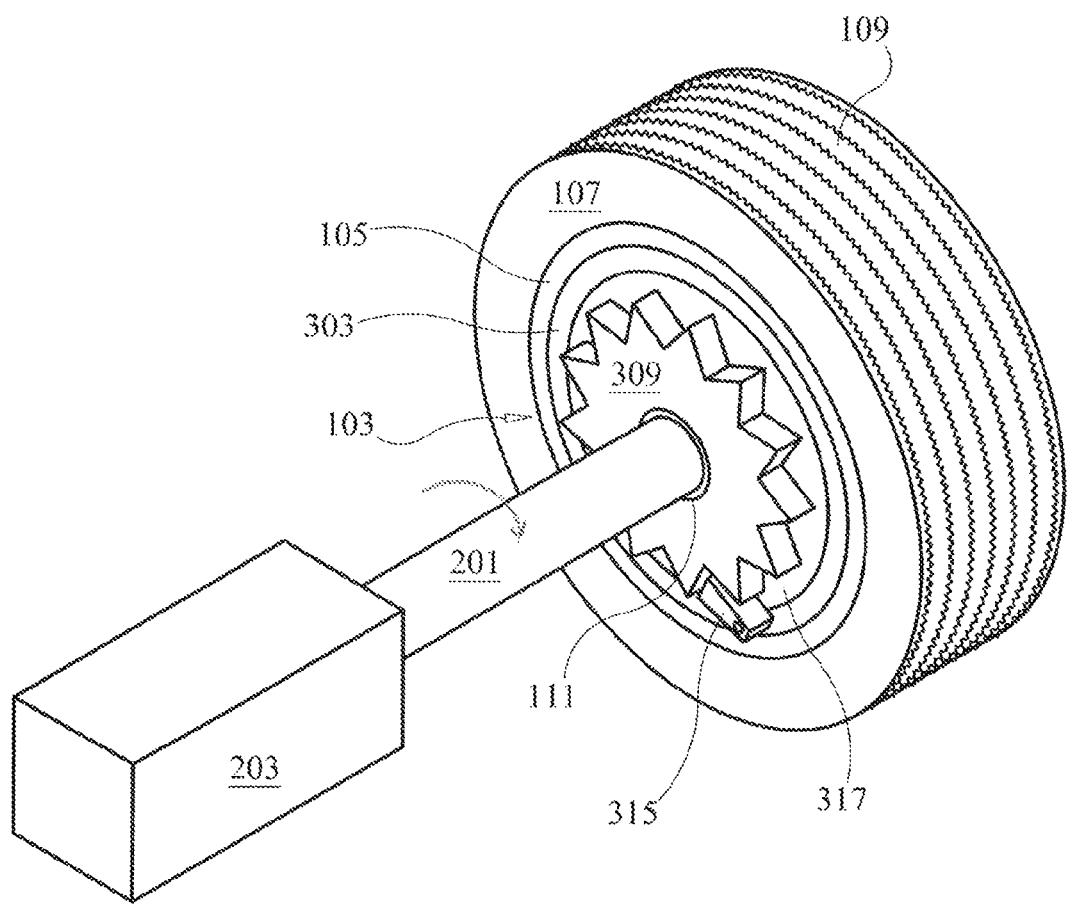
FIG. 4 is a detailed view of the wheelmill of the device showing connection to a shaft and generator, in accordance with an embodiment.

FIG. 4 shows the embodiment comprising a wheelmill 101 and generator 203, in communication via shaft 201. The shaft 201 is rotatably connected to generator 203, such as a rotor shaft, such that the rotation of the shaft 201 also drives the generator to produce energy.

The wheelmill 101 attaches to a shaft 201 preferably via screw fastened in the threaded inlet 111, which in turn is connected to a generator 203. Generator 203 is a standard generator know in the art for producing energy. An alternator may also be used. Generator 203 is preferably coupled with at least one battery for storing the energy generated by the generator 203. Alternatively, generator 203 may be in communication with the vehicle's battery for return of the energy to the vehicle. Such connections between the generator 203 and a battery or other energy storage would be via electrical wiring with respective negative and positive leads for attachment to a battery. The shaft 201 is a solid piece of metal, such as steel. This shaft rotatably communicates with generator 203.

The configuration of the device allows for the continued production of energy even when the vehicle stops or is in reverse. In other words, the device permits the harnessing of residual momentum due to the forward rotation of the shaft to produce energy even if the vehicle wheel has stopped. The one way clutch 103 allows the shaft 201 to continue to spin even when the car is slowing down or there is a sudden brake, thereby preventing backspin of the shaft when the car is in reverse or when the car slows. The shaft 201 will continue to spin so as to generate electricity in the generator 203 even when the body 107 and inner rim 105 of the wheelmill spinning slows or stops due to the vehicle's change in forward rotating motion. In the case of a sudden braking, the body 107 and inner rim 105 will slow or stop moving in accordance with the host wheel's movement; however, because the one way clutch 103 will disengage in that event, hub 317 will continue its forward rotating motion. Because of this, shaft 201 will continue to spin to create electricity generation until the angular momentum created by the previous forward drive dissipates or the vehicle wheel re-engages at a forward spin at a rate higher than the then-present shaft spin. This means that electrical generation continues until either the angular momentum dissipates, or more forward drive is applied that increases the body's 107 revolutions. Another advantage to the disclosed configuration is that the forward angular momentum of the spinning shaft does not interfere with the host wheel itself coming to a stop or slowing down.

FIGS. 3 and 4 are alternate views of the wheelmill of the device depicting arrows to show movement of the various components of the wheelmill. Hub 317 is another term to describe the location of the one way clutch 103 which moves independently of inner rim 105 and body 107 when the vehicle's wheel slows or stops—allowing the shaft to continue to spin to produce electricity within the generator 303, even when the vehicle slows or stops. A ratcheted one way clutch is shown in FIG. 3, having a gear 305, base 303, and pawl 315 together coupled as illustrated, but other types of one way clutch for disengaging the shaft rotation from the body's 107 rotation may he used, such as the ratcheted one way clutch systems used in bicycles allowing for the continued rotation of the wheels when the driver has stopped pedaling. All three components, the clutch 103, inner rim 105, and body 107 move in the same direction when the vehicle is moving forward (Clockwise A). This is because pawl 315 locks against the teeth 309 of the clutch when the host wheel (and therefore body 107/inner rim 105) are moving in the clockwise direction, A. Components 105 and 107 move together in both forward and reverse rotation.

The preferred construction of the wheelmill body is at least partially a rubberized material on the outer surface 109 of body 107. The outer surface 109 may also be metal or a combination of metal and a rubberized material. The outer surface 109 may also be any material with give so as to absorb shock. Outer surface 109 may also have a grooved surface similar to a tire for providing increased traction for receiving the rotational spin from the host wheel. When the vehicle encounters bumps on the road, the rubber will still be firm enough to be rotated by the host wheel, but also compress slightly when encountering a bump—without interruption of spin.

Because the wheelmill is spun by the force exerted by the moving host wheel, it will spin and draw from the torque produced by the host wheel. This is because as the vehicle drives in a forward direction, friction along the connecting surfaces between the wheelmill and the host wheel rolls the wheelmill. The advantage of the device is that it produces more energy from the rotation of the host wheel than is possible to produce from the host wheel itself. This is because the circumference of the wheelmill is smaller than the host wheel, and therefore completes revolutions at a higher rate than the host wheel.

FIG. 7 is an example alternate embodiment of the wheelmill 101 where the wheelmill 101 is constructed of flexible, preferably rubberized, material. The flexible nature of the outer wall 701 of the wheelmill may be accomplished also by the use of flexible spokes 703 connecting the outer wall 701 to an inner wall 705, where the outer wall 701 is constructed of flexible, preferably rubberized material. The advantage to this construction is that the outer portion of the wheelmill may compress and decompress when the wheelmill subjected to jostling forces (such as when the vehicle is driving forward on bumpy terrain) while still allowing the shaft (in communication with wheelmill 101 at point 707) to continue to spin.

The configuration of the disclosed device simplifies the structure and increases the stability of devices for collecting energy from the movement of motor vehicles. For example, the device directly connects the spinning shaft with the rotation of the wheel of the vehicle, due to the communication of wheelmill directly with the wheel. Devices which make use of pulley systems are not as efficient, as any transfer of mechanical force from one component to another naturally results in loss of energy. Another advantage is that the device's wheelmill is configured for placement on the inside of the host wheel. Not only does this allow for a more direct communication between shaft rotation and rotation wheel rotation obviating the need for pulleys and additional gears, it also protects the wheelmill from nonuniform environments present in a ground engagement system. For instance, a ground engagement wheel may traverse over sand and momentarily cease rotating (and simply drag). In that event, there can be no power generation. In contrast, the wheelmill is exposed to a uniform environment, the inside of the wheel. The wheelmill will therefore only cease spinning if there is no more forward drive and the residual forward momentum has dissipated.

Figure 5:
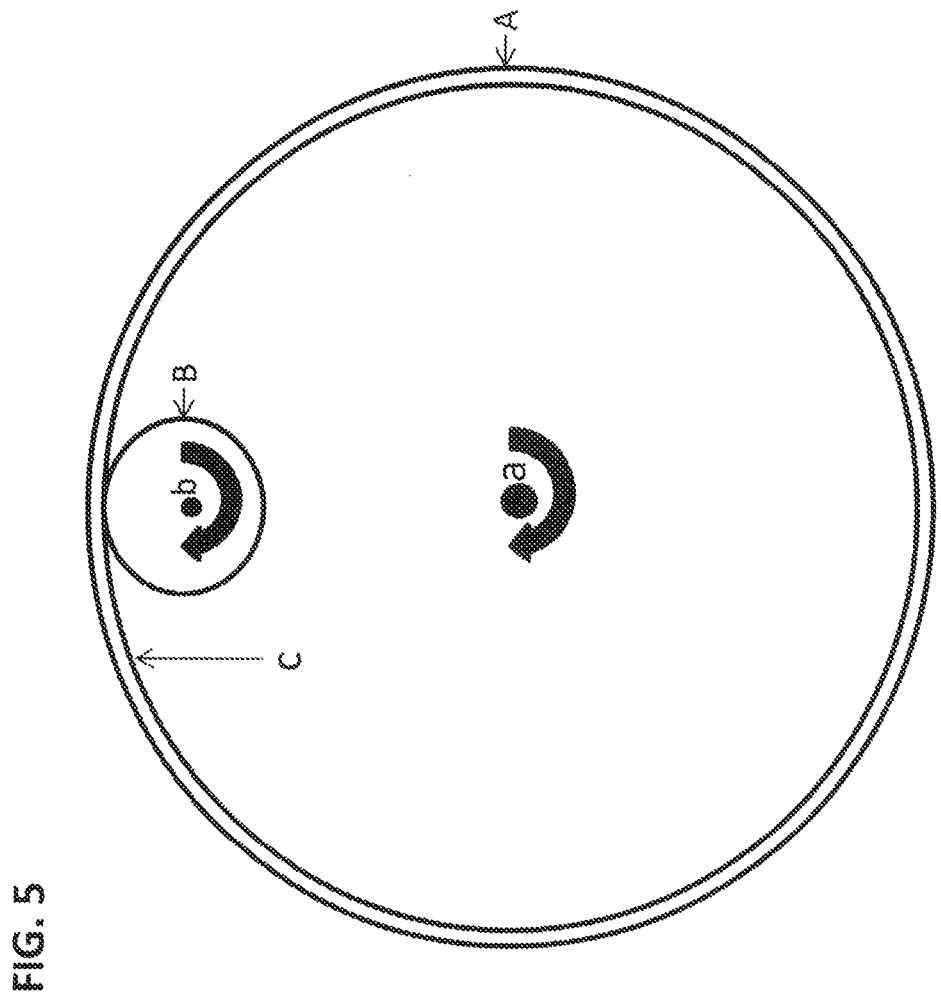
FIG. 5 is a view of the wheelmill in communication with a wheel, showing the axes of the wheel and wheelmill and rotation of both, in accordance with an embodiment.

FIG. 5 is shown to illustrate the way in which the device generates energy from the host wheel in excess of the energy that could be produced if a generator and shaft were attached to the host wheel itself. The main reason is that the device's wheelmill makes more revolutions per unit time, thus generating more energy at a generator having a given torque than would the host wheel itself.

An example is provided in reference to FIG. 5: Imagine circle (A) is an 18" diameter wheel rim, and circle (B) is a 2" diameter wheelmill. The rotational axis of (A) is (a). The rotational axis of (B) is (b). When circle (A) rotates clockwise, traction between its inner snake (C), rolls circle (B) in the same clockwise direction. Because circle (B) is 9 times smaller than circle (A), it can complete a 360 degree turn, 9 times more than (A). Therefore, for every revolution of circle (A), circle (B) is rolled 9 times. The number of revolutions is measured by RPMs and is related to power and torque via the equation, Power=RPMs×Torque/5252.

Figure 6:
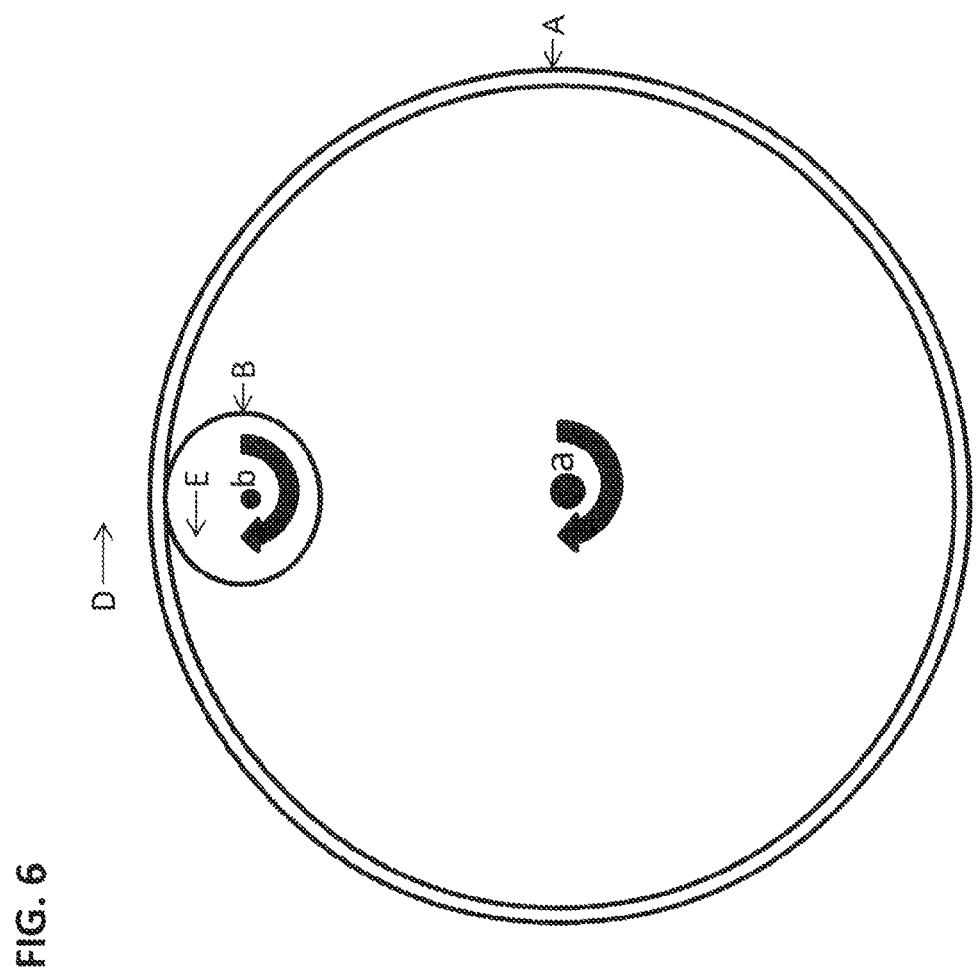
FIG. 6 is an alternate view of the wheelmill in communication with a wheel in accordance with an embodiment.

FIG. 6 is provided to illustrate a sample calculation of power output and comparison between the host wheel v. wheelmill energy output and production. One difference is that RPMs for a host wheel and the wheelmill are different. Circle (A) represents a vehicle wheel rim moving forward, revolving clockwise. The vehicle uses torque coupled with RPMs (horsepower) to turn the rim (A). The direction of vehicle torque (D) is used to propel the vehicle forward. A portion of the vehicle's torque is used to rotate the wheelmill (B), which is connected to the shaft of a generator. Torque resistance of (B) is determined by the ratings of the connected generator. Opposing force of the wheelmill (B) is represented by arrow (E). In this comparison, we assume the vehicle is driven 40 miles in one hour, by a 200 lb-ft torque flat curve electric motor, with an attached wheelmill generator rated 5 kW at 6726 rpms.

| Vehicle power output vs. Wheemill production: | | |
|---|---|---|
| | Vehicle | vs. Wheelmill device |
| Torque | 200 lb-ft | 5.2 lb-ft |
| RPMs | 747 rpm | 6726 rpm |

-continued

| Vehicle power output vs. Wheemill production: | | | | |
|---|---|---|---|---|
| | Torque | × | RPMs | = Power (horsepower, hp) |
| Power loss to wheelmill | 5.2 lb-ft | @ | 747 | = .74 hp/hr |
| Wheelmill production | 5.2 lb-ft | @ | 6726 | = 6.7 hp/hr |

This example shows a wheelmill production of 6.7 hp, for the cost of 0.74 hp.

The vehicle loses an extra 0.74 hp in 1 hour towards turning the wheelmill (B). Wheelmill (B) produces 6.7 hp in that same 1 hour. Therefore, the Power gain=5.96 hp.

The above examples and embodiments have been provided, however the inventive concepts disclosed may be otherwise variously embodied and employed.

I claim:

1. A device comprising
    a wheelmill having a cylindrical shape adapted to receive a rotatable shaft of a generator;
    a one way clutch housed within an inner portion of the wheelmill in communication with the shaft such that said shaft may rotate in one direction only; and
    a generator in communication with the shaft;
    wherein the device is coupled with a vehicle capable of sustaining speeds of at least 30 miles per hour, such that the wheelmill rotatably communicates with an inside wall of the vehicle's wheel;
    wherein when the vehicle drives, the shaft rotates;
    and wherein when the vehicle stops or slows, the one way clutch is adapted to allow the shaft to continue to rotate, until momentum generated by the vehicle's earlier drive is exhausted.

2. The device as in claim 1, wherein the device is coupled with a storage unit for storing electrical energy.

3. The device as in claim 2, wherein the storage unit is a battery.

4. A device comprising:
    a wheelmill having a cylindrical shape adapted to receive a rotatable shaft of a generator, the generator and rotatable shaft being coupled for producing electricity due to the rotation of the rotatable shaft, the wheelmill further comprising
    a body having the shape of a wheel in communication with an inner rim for receiving a one way clutch; and wherein the shaft of the generator further comprises means for connecting said shaft to the one way clutch;
    wherein the device is coupled with a vehicle capable of reaching speeds of at least 30 miles per hour such that the wheelmill rotatably communicates with an inside wall of the vehicle's wheel; and
    wherein when the vehicle drives, the shaft rotates;
    and wherein when the vehicle stops or slows, the one way clutch is adapted to allow the shaft to continue to rotate, until momentum generated by the vehicle's earlier drive is exhausted.

5. The device as in claim 4, wherein the device is removably mounted to the vehicle.

6. The device as in claim 4, wherein the device is coupled with a storage unit for storing electrical energy.

7. The device as in claim 6, wherein the storage unit is a battery.

* * * * *